(12) United States Patent
Wang

(10) Patent No.: US 6,516,029 B1
(45) Date of Patent: Feb. 4, 2003

(54) METHOD AND APPARATUS FOR ADAPTIVE VIDEO ENCODING

(75) Inventor: Ren-Yuh Wang, Cupertino, CA (US)

(73) Assignee: Divio, Inc., Sunnyvale, CA (US)

( * ) Notice: Subject to any disclaimer, the term of this patent is extended or adjusted under 35 U.S.C. 154(b) by 0 days.

(21) Appl. No.: 09/264,221

(22) Filed: Mar. 5, 1999

Related U.S. Application Data

(60) Provisional application No. 60/077,074, filed on Mar. 6, 1998.

(51) Int. Cl.[7] ................................................ H04B 1/66
(52) U.S. Cl. ........................ 375/240.01; 375/240.01; 375/240; 382/240; 382/279; 382/232; 382/303
(58) Field of Search .......................... 375/240.01, 240; 382/240, 250, 232, 279, 278, 303; 348/398

(56) References Cited

U.S. PATENT DOCUMENTS

| | | | | |
|---|---|---|---|---|
| 5,006,931 A | * | 4/1991 | Shirota | 375/240.2 |
| 5,054,103 A | * | 10/1991 | Yasuda et al. | 382/250 |
| 5,594,812 A | * | 1/1997 | Boliek et al. | 382/232 |
| 6,118,902 A | * | 9/2000 | Knowles | 382/240 |

* cited by examiner

*Primary Examiner*—Andy Rao
*Assistant Examiner*—Shawn S. An
(74) *Attorney, Agent, or Firm*—Townsend and Townsend and Crew LLP

(57) ABSTRACT

New and improved apparatus and methods for video encoding, for example, to efficiently and concurrently apply adaptive encoding techniques to convert analog data into digital formats, such as Digital Video (DV) format. A parallel system receives a block of video data and based on the computations and comparisons performed determines the best quantization factor for the block of video data. In an embodiment, the parallel system performs selected operations in parallel to save time and increase speed.

1 Claim, 3 Drawing Sheets

METHOD AND APPARATUS FOR ADAPTIVE VIDEO ENCODING

CROSS-REFERENCES TO RELATED APPLICATIONS

This application claims priority from U.S. Provisional Patent Application No. 60/077,074, filed Mar. 6, 1998, entitled "Method and Apparatus for Adaptive Video Encoding," which is incorporated herein by reference in its entirety for all purposes.

BACKGROUND OF THE INVENTION

The present invention relates to the field of image processing. More specifically, the present invention relates to methods and apparatus for efficiently and concurrently applying video encoding techniques to convert analog data into digital formats, such as Digital Video (DV) format. This technique is especially suited for widely-used image compression standards that integrate various algorithms into a compression system, such as the standards specified in the DV Standard (DV-SD or the "Blue Book"), which is included herein by reference in its entirety and for all purposes.

The DV format is quickly becoming the standard for many consumer electronic video devices. For example, DV format camcorders can now be found with more frequency and at more competitive prices than the conventional analog 8 mm and VHS camcorders. At the same time, DV camcorders provide advantages which are inherent to digital technology, such as high quality of video and sound, digital filtering, digital error correction, and the like. DV provides quality at or higher than the high-end of the conventional analog camcorders such as Hi-8 mm and S-VHS, with much added flexibility. Also, digital format data can be repeatedly copied without loss of quality.

In the DV standard, the compression ratio is expected to be around 5:1. This means that excessive truncations of redundant data are unnecessary and image quality will not be compromised as much as some other digital standards available on the market now. In order to maintain a constant compression ratio, the compression analysis can be performed on the image at its video segment level. Each image frame consists of 270 video segments under National Television System Committee (NTSC) standard. Each image consists of 324 under Phase Alternation System (PAL) standard. Each video segment consists of five (5) macro blocks and each macro block contains six (6) blocks of 8×8 pixels.

The DV standard utilizes the 8×8 blocks in performing compression (also known as, "frame" compression). This data is provided by digitizing an image frame by frame originally in analog format. The analog image signals can originate from cable TV, analog camcorders, video cassette recorders (VCR's), and other similar analog sources. After digitization and encoding, the signals representing the image can be utilized by digital devices.

A well known technique in the prior art for compression of digitized data is to apply discrete cosine transform (DCT) to a block of data to transform the data from the spatial domain to the frequency domain. The resulting coefficients in the frequency domain act as weighing factors corresponding to their respective cosine curve. For background part of the image data, coefficients corresponding to higher frequency data will have a lower value. Conversely, coefficients corresponding to lower frequency data will have a higher value.

The transformation from the spatial domain to the frequency domain, however, does not by itself compress the digital data. After digital data is transformed into the frequency domain, an adaptive quantization can be applied to compress the data. In particular, adaptive quantization truncates the coefficients corresponding to high frequency data, and in most cases to zero. In essence, adaptive quantization will compress an image by deleting the extreme details of an image.

As a result, a technique is desirable wherein digital video data can be encoded adaptively.

SUMMARY OF THE INVENTION

The present invention provides new and improved apparatus and methods for video encoding, for example, to efficiently and concurrently apply adaptive encoding techniques to convert analog data into digital formats, such as Digital Video (DV) format. A parallel system receives a block of video data and based on the computations and comparisons performed determines the best quantization factor for the block of video data. In an embodiment, the parallel system performs selected operations in parallel to save time and increase speed.

For further understanding of the nature and advantages of the present invention, together with other embodiments, reference should be made to the ensuing detailed description taken in conjunction with the accompanying drawings.

DESCRIPTION OF THE SPECIFIC EMBODIMENTS

Figure 1:
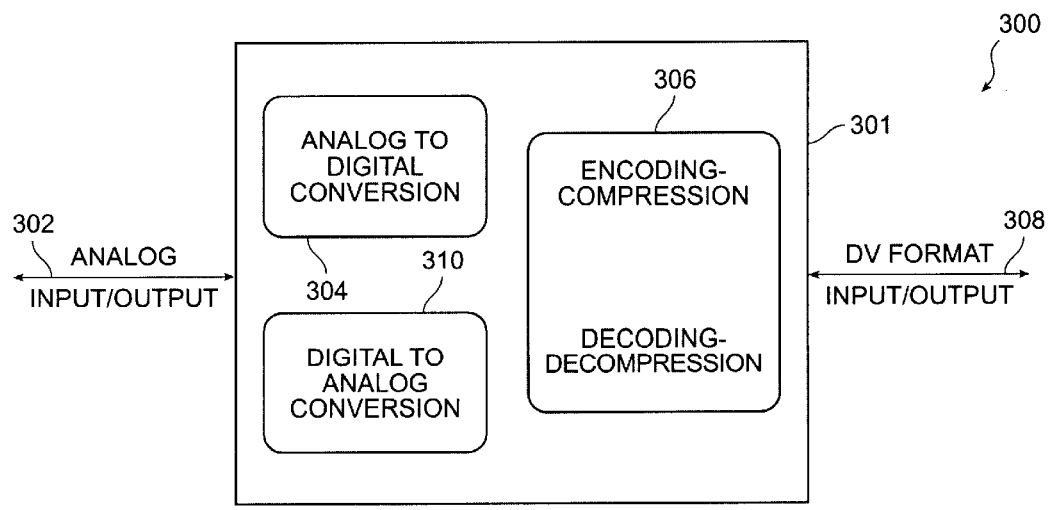
FIG. 1 illustrates a simplified block diagram of a system 300 in accordance with the present invention.

FIG. 1 illustrates a simplified block diagram of a system 300 in accordance with the present invention. Block 301 converts analog data into DV format data, and vice versa. Analog data is input and output at an analog node 302. DV data is input and output at a DV node 308. The analog signals can include those for cable TV, analog camcorders, video cassette recorders, and other analog sources. The DV format data can include those for digital DV camcorders, digital video editors, other DV format equipment, and other forms of storage such as memory in a PC, set atop boxes, WebTV®, and the like.

When converting analog data to DV format, an A/D converter 304 converts the analog data received at the analog node 302 to digital data. The digital data from the A/D converter 304 is then input into a coding-compression block 306 for encoding and/or compression. The encoded/compressed data is then output at the DV node 308 in DV format.

When converting DV format data to analog data, DV format data is input into block 301 at the DV node 308. The DV format data is then decoded and/or decompressed by the coding-compression block 306. The decoded/decompressed data is then received by D/A converter 310 which converts the digital data to analog and then outputs the analog data at the analog node 302. Alternatively, blocks 304 and 310 can be implemented on the same chip or onto two separate chips.

Figure 2:
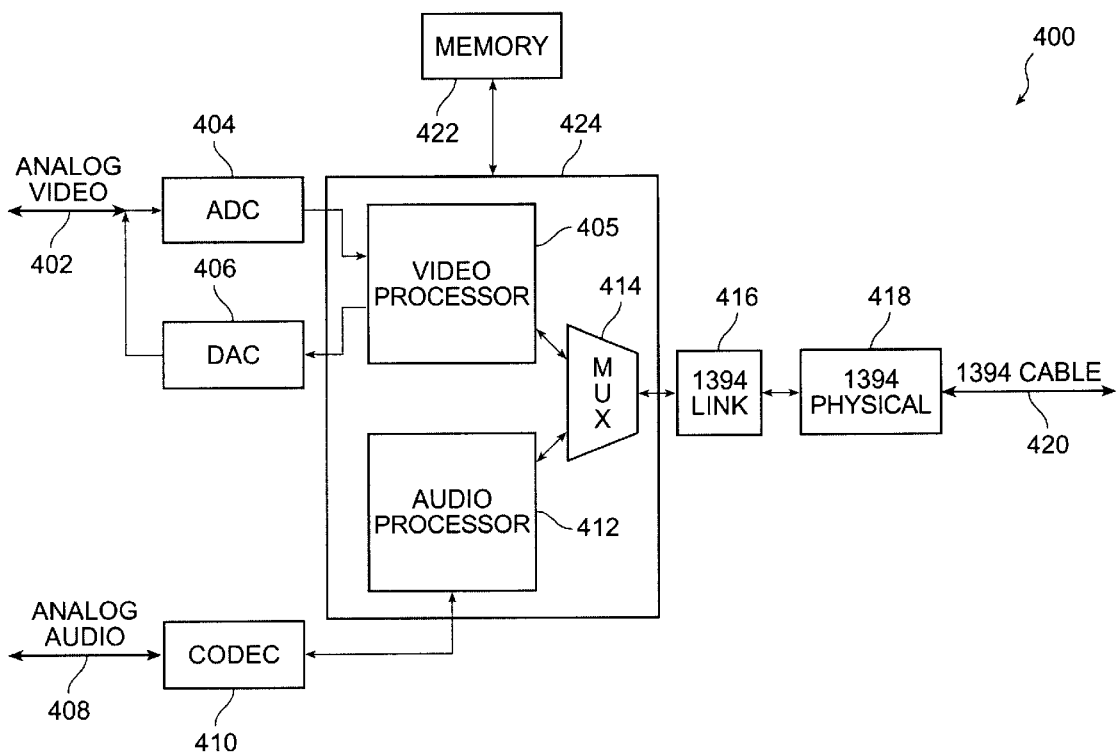
FIG. 2 illustrates a more detailed illustration of block 301 of FIG. 1.

FIG. 2 illustrates a system 400. The system 400 is a more detailed illustration of block 301 of FIG. 1. Analog video data is received at analog video node 402. The received data is then provided to an A/D converter 404 which converts the analog video data into a digital format. The digitized data from the A/D converter 404 is provided to a video processor 405 which performs video processing on the digitized video data. When outputting analog video data at the analog video node 402, a D/A converter 406 converts the digital analog video data from the video processor 405 into analog video data.

Audio data is received in analog format at an analog audio node 408. The analog audio data is provided to an audio converter 410. The audio converter 410 can convert analog audio data into digital format and vice versa. The audio converter 410 can be a Philips Electronics® UDA1344 or other suitable audio converter chips. The audio converter 410 is coupled to an audio processor 412. The audio processor 412 processes digital audio signals. The audio processor 412 can be any suitable audio processing chip such as digital signal processor (DSP) chips available from Texas Instruments®. A multiplexer 414 multiplexes data from/to the video processor 405 and the audio processor 412. The multiplexer 414 is coupled to a link chip 416. The link chip 416 is preferably a purely digital chip and provides a link layer for communication in accordance with 1394 standard originally designed by Apple Computer, Inc.® Currently, the 1394 standard can provide a bandwidth of 100 Mb/sec, 200, 400, or 800 Mb/sec. Other brands of link chips can also be used such as Texas Instruments® TSB12LV42 and Phillips Electronics® PD11394L21. The link chip 416 is coupled to physical layer 418 which provides a connection in accordance with the 1394 standard. The physical layer 418 is coupled to a cable 420 which is also designed in accordance with standard 1394. The cable 420 can also be an optical cable.

FIG. 2 also illustrates a memory 422 which can be any type of storage such as dynamic random access memory (DRAM), extended output DRAM (EDO DRAM), synchronous DRAM (SDRAM), video RAM (VRAM), static RAM (SRAM) and the like. The memory 422 provides storage for devices within system 400 including storage for functions performed within block 424, such as functions performed by the video processor 405 and the audio processor 412. Additionally, some elements of the system 400 can have their own local memory.

Figure 3:
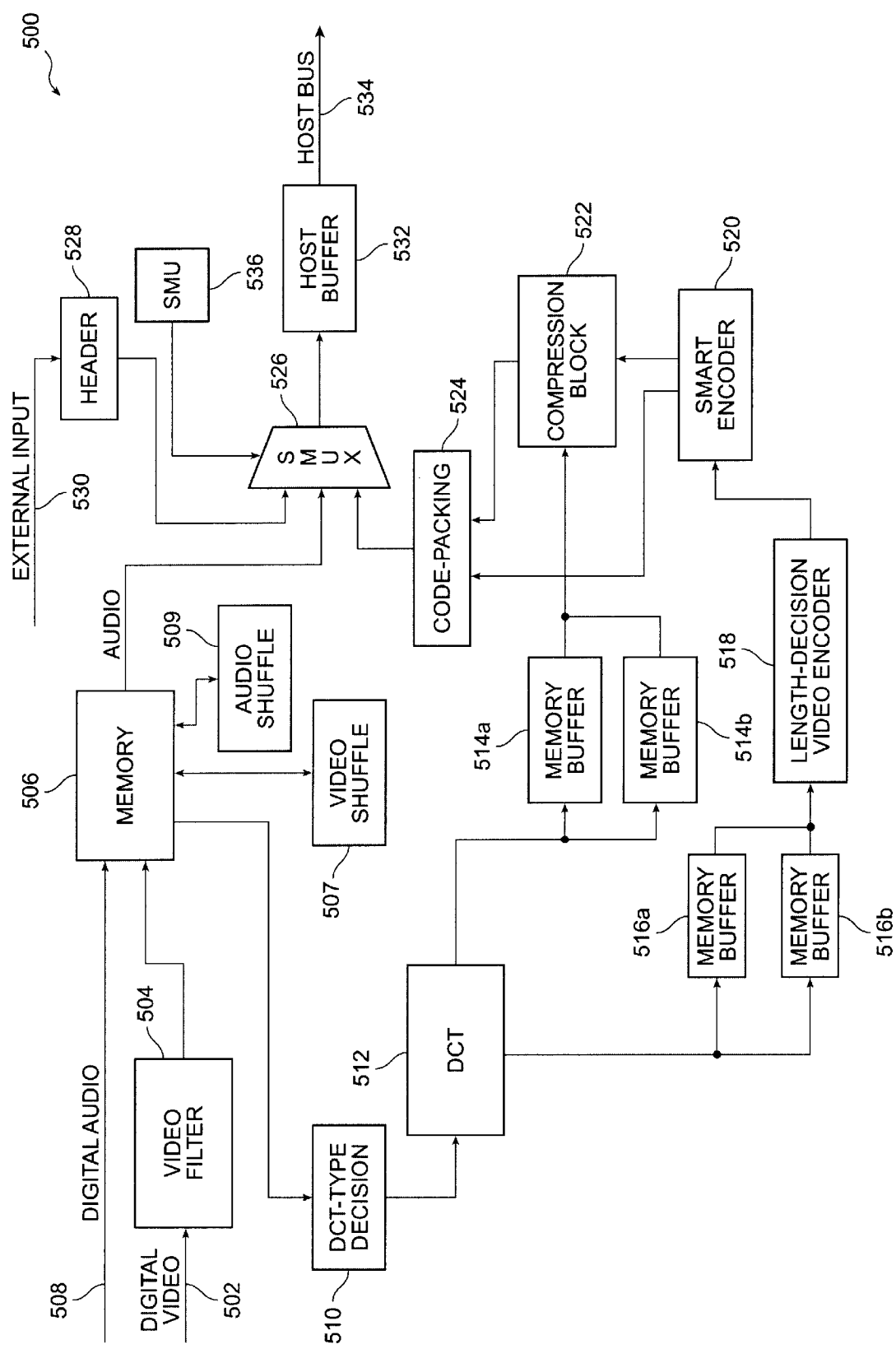
FIG. 3 illustrates a more detialed block diagram of the coding-compression

FIG. 3 illustrates a system 500. The system 500 is a more detailed block diagram of the coding-compression block 306 of FIG. 1. Digital video data is received at a video node 502. The received digital video data is preferably in 4:2:2 format, indicating four bytes of data for luminance (Y), two bytes of data for chrominance red (CR) and two bytes of data for chrominance blue (CB), respectively. The digital video data can be provided by any video decoder chip, such as Phillips Electronics® SAA7112. A video filter 504 performs filtering operations on the digital video data received at the video node 502. The filtering operations can include filtering for NTSC or PAL television system standards. For example, for NTSC the 4:2:2 format data can be filtered into 4:1:1 format. For PAL, the 4:2:2 format data can be filtered into 4:2:0 format data. Other filtering operations by the video filter 504 can include horizontal and vertical filtering to remove noise. The filtered video data from the video filter 504 can be stored in a memory 506. The video data can be arranged by a video shuffle block 507 to store the video data more efficiently in the memory 506. The memory 506 can also store digital audio data received at an audio node 508. An audio shuffle block 509 can arrange the audio data more efficiently in the memory 506. The memory 506 can be any type of storage such as DRAM, EDO DRAM, SDRAM, VRAM, SRAM, and the like. The memory 506 provides storage for devices within the system 500. Additionally, some elements of the system 500 can have their own local memory.

The video data stored in memory 506 can be retrieved by DCT-type decision block 510. The DCT-type decision block 510 can determine whether 8×8 or 2×4×8 type DCT should be performed on the retrieved video data. The retrieved video data is then provided to a DCT block 512 which is configured to perform the discrete cosine transformation on the retrieved data. The DCT block 512 will perform the DCT operation on the retrieved data in accordance with the DCT-type decision made by the DCT-decision block 510. The transformed data from the DCT block 512 is stored in memory buffers 514a–b and 516a–b. The memory buffers 514a–b can be identical. Similarly, the memory buffers 516a–b can be identical. The memory buffers 514a–b preferably store 1 k×20 bits of data. Memory buffers 516a–b preferably store 64×10 bits of data. Such a configuration will allow storage of one video segment in each of the memory buffers 514a–b. As detailed above, each video segment includes five (5) macro blocks and each macro block includes six (6) blocks of 8×8 pixels. Also, such a configuration will permit the memory buffers 516a–b to each store one 8×8 block of DCT transformed data. The memory buffers 514a–b and 516a–b will act as back and forth memory buffers, i.e., each time one memory buffer is filled, incoming data will be stored in the other memory buffer. Similarly, when data is read from one memory, the other memory buffer is being filled. For example, with respect to the memory buffers 516a–b, if the 0th 8×8 block is stored in the memory buffer 516a, the 1st block of the 8×8 block data is stored in the memory buffer 516b. Similarly, the 2nd 8×8 block is stored in the memory buffer 516a and the 3rd 8×8 block of data is stored in the memory buffer 516b. The 8×8 blocks stored in the memory buffers 516a–b are input into a length-decision video encoder 518. The length-decision video encoder 518 receives the frequency-domain pixel information transformed by the DCT block 512.

In contrast with other types of compression techniques, DV video encoding incorporates a few dynamically adjusted parameters to help maintain the video compression ratio at around 5:1. These parameters include the DCT-type (8×8 or 2×4×8), class number (0, 1, 2, and 3), Quantization or Q factor (0–15), and limited selection of quantization factor (powers of 2, simplifying implementation). These parameters are related to both the spatial-domain information (before DCT) and the frequency-domain information (after DCT). The almost constant compression ratio requirement can be maintained by determining the appropriate compression factors before any actual compression is performed. For example, the length-decision video encoder 518 determines the length information necessary for variable length coding (VLC).

There are sixteen possible Q factors (also know as "Q-numbers"). The length-decision video encoder 518 determines the length information for the received data from the memory buffers 516a–b based on five out of the sixteen possible Q factors. The reason for choosing only five of the sixteen possible Q-numbers is to reduce the number of computations and comparisons. The length-decision video encoder 518 computes the length for each of the Q-numbers, which is then used to look up an encoded length from an encoding table. Preferably, the five Q-numbers used are 0, 3, 7, 11, and 15 to provide a more dynamic range of values.

After the length decision, the data is input to a smart encoder 520. The smart encoder 520 determines which Q factors would provide the best compression based on the length decision for each block of 8×8 data. The selected Q-numbers are provided to compression block 522 for application to video segments stored in the memory buffers 514a–b. The compression block 522 can also include a code-decision video encoder for variable length coding. The smart encoder 520 also provides length information to a code packing block 524. The length information includes data about length of data stored in each macro block. The code packing block 524 receives the compressed data from compression block 522 and the macro block length information from smart encoder 520. The code packing block 524 arranges video data efficiently into a bit stream. The code packing block 524 is coupled to a system multiplexer 526. The system multiplexer 526 also receives audio data from the memory 506 and header information from a header block 528. The audio information can be from the audio node 508, and other sources of audio, such as audio overlays, editors, and the like. The header information can be input from outside the system. For example, external information such as close captioning, Tele-text, or different language subtitles, can be received from an external input 530.

The system multiplexer 526 arranges the outgoing data based on timing considerations to recreate real-time data in an appropriate order. The output of the system multiplexer 526 is coupled to a host buffer 532. The host buffer 532 is coupled to a host bus 534. The host buffer 532 ensures that data is buffered before it is provided to the host bus 534. Such a configuration will, for example, ensure that data will not be lost if the host bus is busy. The code packing block 524 can be coupled to the system multiplexer 526 through a pair of memory buffers similar to the memory buffers 514a–b (not shown). Such memory buffers would have a similar configuration, i.e., one would be read from while another is receiving data. The size of these memory buffers is preferably 385 bytes each. The system multiplexer unit 536 will provide control data to the system multiplexer 526 based on timing considerations to recreate real-time data flow in an appropriate order. Accordingly, the digital audio data received on the audio node 508 and the digital video data received on the video node 502 will be converted to DV format data by system 500 and output at node 534.

Figure 4:
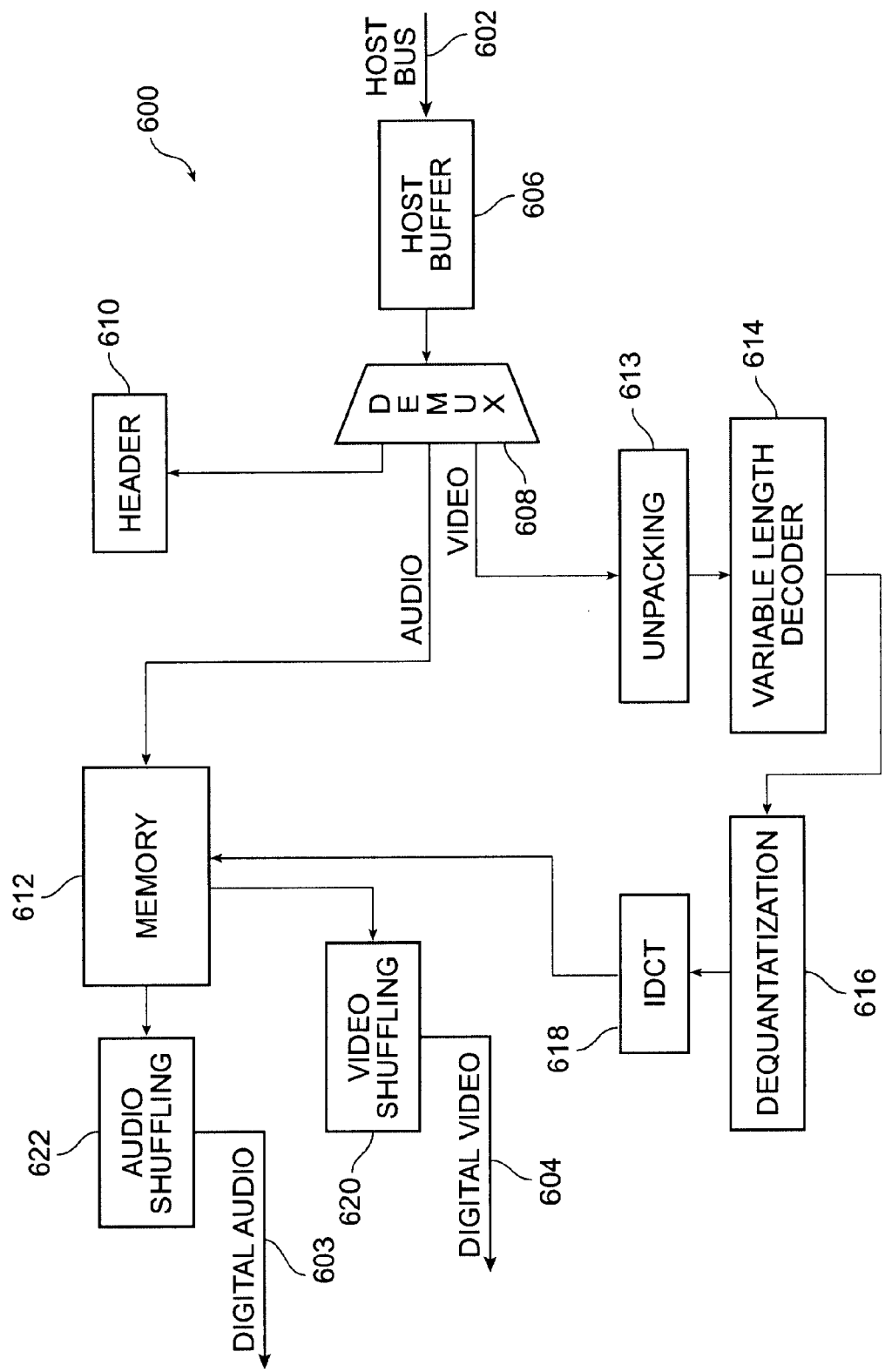
FIG. 4 illustrates a simplified block diagram of a system for converting DV data to digital data. block 306 of FIG. 1.

FIG. 4 illustrates a simplified block diagram of a system 600 for converting DV data received at a host node 602 to digital audio and video data which are respectively output at a digital audio node 603 and a digital video node 604. The DV data from the host node 602 is received by a host buffer 606. The host buffer 606 buffers the DV format data and provides the data to a demultiplexer 608. The demultiplexer 608 demultiplexes the DV data received from the host buffer 606 and provides header data to a header block 610, audio data to a memory 612, and video data to an unpacking block 613. The header data can be information such as close captioning, Tele-text, different language subtitles, and other data embedded in the DV format data. The memory 612 can be any type of storage such as DRAM, EDO DRAM, SDRAM, VRAM, SRAM, and the like. The memory 612 can also provide storage for devices within the system 600. Moreover, some elements of the system 600 can have their own local memory.

The unpacking block 613 is configured to convert the bit stream data to bit streams for each video block and provide these unpacked blocks of data to a variable length decoder 614. The variable length decoder 614 decodes the DV video data in accordance with variable length decoding techniques. The output of variable length decoder 614 is coupled to a dequantization block 616 which dequantizes the DV bit stream in accordance with embedded dequantization factors. The dequantization block 616 is coupled to an inverse DCT (IDCT) block 618 which is configured to perform inverse discrete cosine transformation on the dequantized bit stream. The IDCT operation converts data from the frequency domain to the spatial domain. The spatial domain video data is then stored in the memory 612. A video shuffling block 620 retrieves the stored video data from the memory 612 and arranges the video data in an appropriate order if necessary. The video shuffling block 620 can also perform operations such as interpolation and filtering on the retrieved video data. For example, the video shuffling block 620 can perform a seven-tap horizontal filter which would convert a 4:1:1 format video data to a 4:2:2 format video data. Also, a three-tap vertical filter can be performed by the video shuffling block 620 to convert video data from 4:2:0 to 4:2:2 format. The output of the video shuffling block 620 can then be converted to analog format. At this stage, a chip such as Phillips Electronics® SAA7121 can be used to perform the conversion operations.

Similarly, an audio shuffling block 622 retrieves the stored audio data from the memory 612 and arranges the audio data in an appropriate order if necessary. The audio shuffling block 622 can also perform operations such as interpolation and filtering on the retrieved audio data. The output of the audio shuffling block 622 can then be converted to analog format. At this stage, a chip such as Phillips Electronics® UDA1344 can be used to perform the conversion operations.

Further details of the smart encoder 520 of FIG. 3 are shown in FIGS. 7 and 8 of the attached Appendix A. Appendix A also includes further description of the smart encoder 520. Appendix B is also attached hereto and contains additional information about aspects of the present invention.

The present invention has been implemented with a commercially available 0.35 $\mu$m CMOS process.

As will be understood by those with ordinary skill in the art, the present invention may be embodied in other specific forms without departing from the spirit or essential characteristics thereof. For example, the techniques of the present invention can also be applied to other compression systems such as the standards specified by the Joint Photographic Experts Group (JPEG), Motion Picture Experts Group (MPEG), or MPEGII. These standards are included by reference herein, in their entirety and for all purposes.

Alternately, the techniques of the present invention can be implemented in a computer system. For example, the systems of FIGS. 3–6 can be implemented on a peripheral component interconnect (PCI) card. The PCI card can be installed onto the PCI bus of a personal computer. Also, other bus technologies such as NUBUS, ISA, EISA, Universal Serial Bus (USB), 1394 bus, and Accelerated Graphics Port (AGP) can also be utilized. Also, the techniques of the present invention can be implemented by utilizing the available routines and features such as caching, new instruction sets, and single instruction multiple data (SIMD) tools which are provided by Intele Corporation's MMX™ technology, Advance Micro Device,® Inc.'s 3DNow!™ technology, and their equivalents. Furthermore, the techniques of the present invention can be applied to blocks of data other than 8×8. For example, the techniques of the present invention can be applied to 16×16 blocks of data, and the like. Additionally, even though the techniques of the present invention have been discussed with respect to DCT transformation other types of transformations can also be utilized such as wavelet transform and vector quantization (VQ). Accordingly, for an understanding of the scope of the invention, reference should be made to the appended claims.

What is claimed is:

1. A smart encoder device for adaptively encoding video data comprising:

a first storage device configured to store video data;

a first multiplexer coupled to the first storage device and configured to receive the stored video data;

a summer coupled to the first multiplexer and configured to receive multiplexed video data from the multiplexer, the summer further configured to sum the received multiplexed video data;

a second storage device configured to receive the summed video data from the summer;

a plurality of multiplexers coupled to the second storage device, the plurality of multiplexers configured to receive respective outputs of the second storage device;

an adder coupled to the plurality of multiplexers; the adder configured to add outputs from the plurality of multiplexers; and a comparator coupled to the adder, the comparator configured to compare its input with a maximum value from previous length and output a maximum value for a quantization block.

* * * * *